D. METRUSTRY.
PROCESS AND APPARATUS FOR MOLDING AND FACING CEMENTITIOUS BODIES.
APPLICATION FILED MAR. 22, 1915.
1,211,953.
Patented Jan. 9, 1917.
2 SHEETS—SHEET 1.
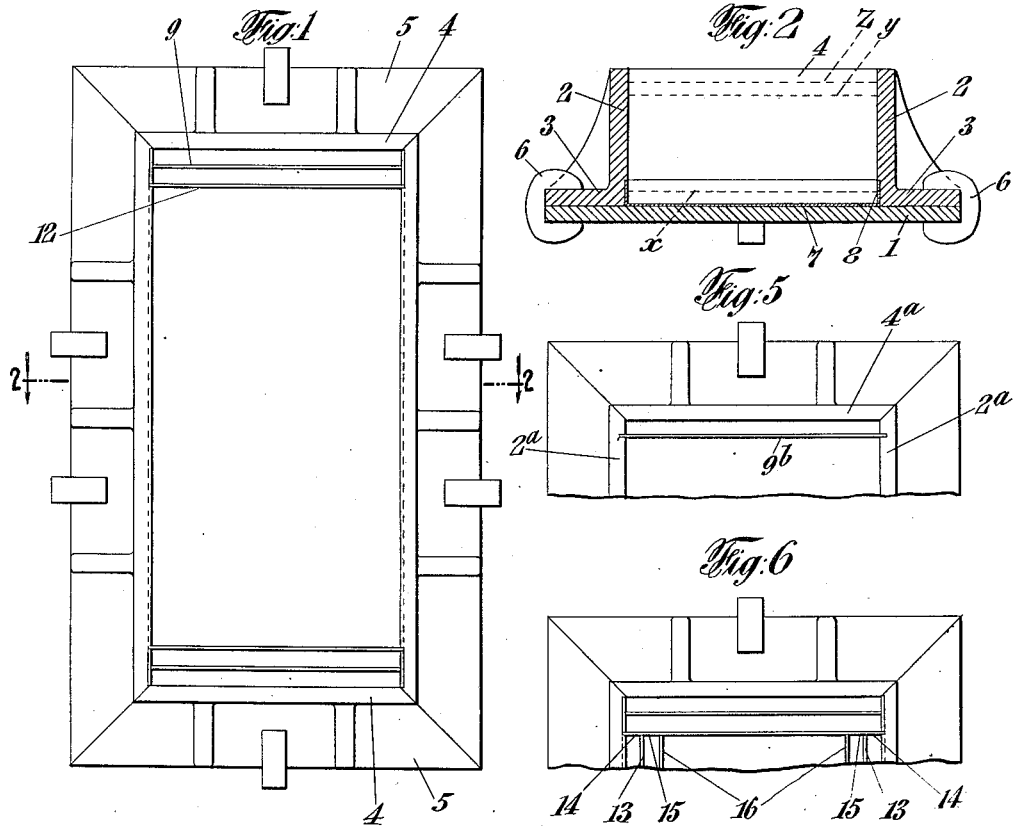
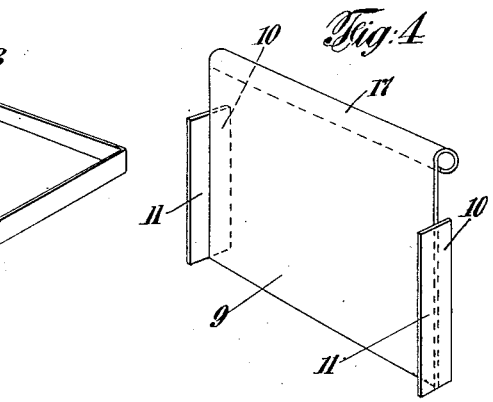
David Metrustry INVENTOR
BY
ATTORNEYS D. METRUSTRY.
PROCESS AND APPARATUS FOR MOLDING AND FACING CEMENTITIOUS BODIES.
APPLICATION FILED MAR. 22, 1915.
1,211,953.
Patented Jan. 9, 1917.
2 SHEETS—SHEET 2.
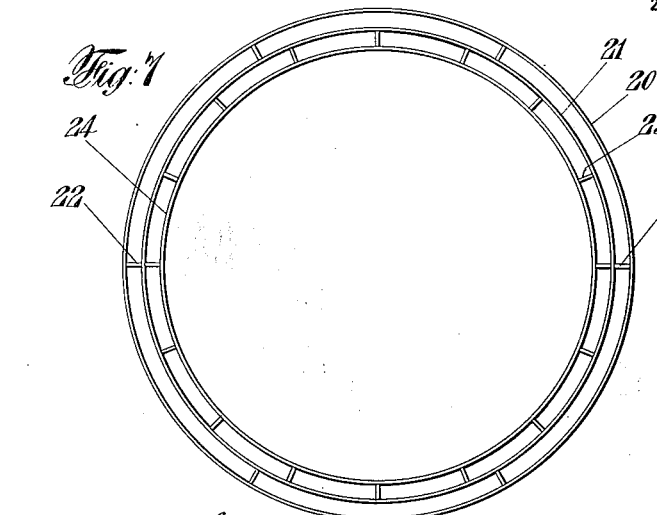
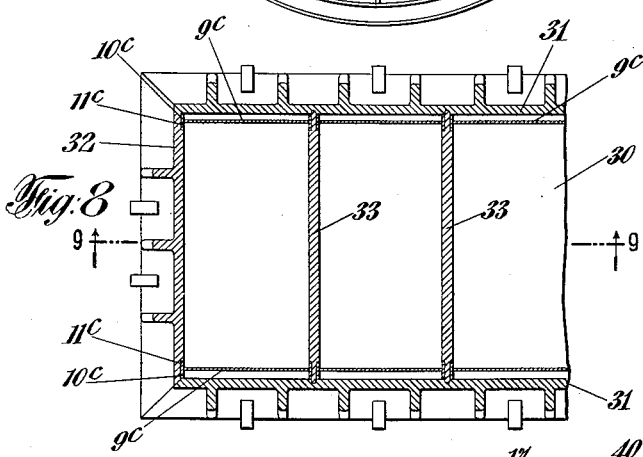
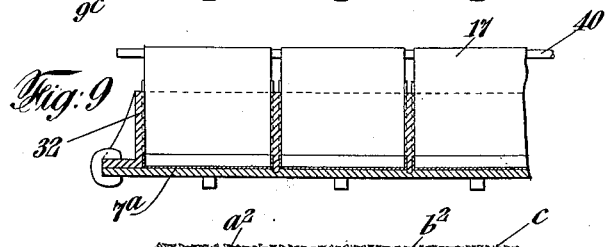
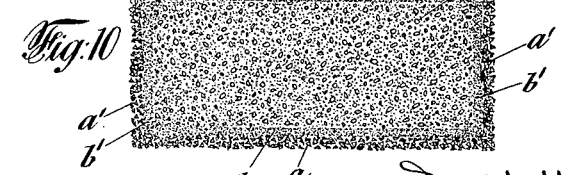
INVENTOR
David Metrustry
BY
Whitaker Prevost ATTORNEYS

UNITED STATES PATENT OFFICE.

DAVID METRUSTRY, OF NEWBURGH, NEW YORK.

PROCESS AND APPARATUS FOR MOLDING AND FACING CEMENTITIOUS BODIES.

1,211,953.     Specification of Letters Patent.     Patented Jan. 9, 1917.

Application filed March 22, 1915. Serial No. 16,015.

*To all whom it may concern:*

Be it known that I, DAVID METRUSTRY, a citizen of the United States, residing at Newburgh, in the county of Orange and State of New York, have invented certain new and useful Improvements in Processes and Apparatus for Molding and Facing Cementitious Bodies; and I do hereby declare the following to be a full, clear, and exact description of the invention, such as will enable others skilled in the art to which it appertains to make and use the same.

My invention consists in the novel features hereinafter described, reference being had to the accompanying drawings which illustrate several forms of apparatus embodying my invention and adapted to carry the same into effect, the same having been selected by me for purposes of illustration, and my invention is fully disclosed in the following description and claims.

Referring to the drawings, Figure 1 is a top plan view of a mold embodying my invention and adapted to carry the same into effect. Fig. 2 is a vertical sectional view of the same on line 2—2 of Fig. 1. Fig. 3 is a perspective view of a bottom pan which is used in connection with the mold when the bottom face of the body is to be given an exterior finish hereafter described. Fig. 4 is a perspective view of one of the removable partition members hereinafter referred to. Fig. 4ª is a sectional view illustrating a modified arrangement of the partition member and auxiliary partition member. Fig. 5 is a partial top plan view similar to Fig. 1, showing a modification. Fig. 6 is a view similar to Fig. 5 showing a further modification. Fig. 7 is a top plan view of a mold adapted for producing a body circular in cross section. Fig. 8 is a horizontal sectional view of a multiple mold embodying my invention, for producing a plurality of similar cementitious bodies. Fig. 9 is a longitudinal vertical section of the same on line 9—9 of Fig. 8. Fig. 10 is a side elevation of a brick or rectangular shaped body made in accordance with my invention and provided on four surfaces with the exterior finish hereinafter described.

In the manufacture of cementitious bodies, the central main portion of the same is ordinarily formed of composition of cement with more or less coarse granular material, such as heavy sand or gravel, broken stone, etc., and such articles require an exterior surface or finish which, as a matter of economy comprises a thin layer of cement and finely divided granular material applied to the exterior of the central portion and treated with suitable coloring matter, if desired, and in some cases, with an external coating of dry granular material. In the ordinary manufacture of cementitious bodies of this character it is customary to first form the central portion by compacting the material in a suitable mold, and to finish the exterior surfaces, by applying a coating of semi-liquid cementitious dressing after the main body portion has set or hardened and dried. This is objectionable for the reason that a proper union of the facing material and the central portion of the body can not be thus effected and when exposed to the weather, the facing portion will disintegrate in the course of a comparatively short period, exposing the rough but permanent central portion.

According to my invention, I support adjacent to one or more of the interior faces of the mold, a thin layer of the material which is to constitute the exterior surfaces of the body. This may be what I term a facing composition, composed of cement and finely divided granular material which is preferably mixed in the consistency of a stiff paste or it may be a layer of dry granular material, such as ground or powdered granite, marble dust, or any other suitable material, and in some cases, I may use both the dry granular material, which will be maintained next to the faces of the mold with a layer of the so-called facing material in rear of it. The main or central portion of the body is composed of a liquid or semi-liquid mass of cement with coarser granular material, which I prefer to mix in such consistency that it can be readily poured into the mold and will settle therein, as distinguished from a comparatively dry mixture which requires to be packed and consolidated in the mold by extraneous means. The liquid mass is poured into the mold while the single or double layer of facing material is supported parallel to one or more faces of the mold, as before described, and is then permitted to unite with the exterior layer or layers, the liquid condition of the central portion permitting it to permeate the exterior layer or layers and unite the entire mass including the dry granular material if such is used for the exterior coating. The entire mass then sets, hardens, and dries, so as to form a unitary block in which the exterior portions are as firmly united and weather-proof as any other portions of the block.

In carrying out my invention in the production of slab-like bodies or blocks, such for example as the brick or block illustrated in Fig. 10, I am able to provide the exterior finish of any desired kind on any one or more or all six faces of the block, as may be desired. For example, if it be supposed that it is desired to provide the block with the facing layer and exterior granular layer on four sides, to wit, top, bottom, and ends, as indicated in Fig. 10, the following procedure would be carried out. Upon the bottom of the mold would be placed, first, a layer of dry granular material, indicated at $a$ in Fig. 10, in which the thickness of the exterior layers is exaggerated for greater clearness. Upon the granular layer $a$ is superimposed a thin layer $b$ of the facing material in the form of a plastic sheet, which may be composed of cement and finely divided granular material, preferably having a uniform color. If coloring material is used, it will be mixed with the material composing this facing layer, thus giving the desired color to the body without the necessity of wasting the color material by carrying it through the central portions of the body. Adjacent to the opposite ends of the molds, vertical layers of the granular material, $a'$—$a'$, and corresponding vertically disposed layers $b'$—$b'$ of the facing material will be supported, preferably by temporary or removable means and the central or main portion of the body $c$ will then be poured into the mold until the mold is filled, and allowed to settle therein. It will be seen that the liquid central portion $c$ will immediately permeate the layers $b$—$b'$ of the facing mixture and the layers $a$—$a'$ of the dry granular material, thus uniting them with the central portion. This may be readily effected by the removal of the temporary or removable means for supporting the vertical layers, as hereinafter more fully described, or in any other desired way, which will give access from the part of the liquid central portion $c$ to the exterior layers. It is a known fact that when cement is poured in this manner, it tends to shrink and settle perceptibly in the mold and I find that in ordinary operations, this settling takes place to an extent which is approximately equal to the thickness of a facing or finishing layer. As soon as the cement has settled to the required degree, I apply a layer of the facing material $b^2$ upon the top of the same and upon the top of said layer I apply a finishing layer of the dry granular material $a^2$, these two top layers being applied before the central liquid or semi-liquid portion has set and while it is still in practically liquid or semi-liquid form. The top layers also absorb liquid portions from the central portion $c$, which unite the layers $b^2$ and $a^2$ in the entire structure, thus producing a body which when set, hardened, and dried, is perfectly faced on four sides. Obviously the facing can be omitted from any one or more of the sides if it is not required, and if it is desired to face all six sides, the lateral faces of the mold will be supplied with supported layers of the facing material or materials before the central portion $c$ is poured, in the manner heretofore described.

In the drawing I have illustrated several forms of apparatus for carrying my invention into effect. In Figs. 1 and 2, for example, I have shown a mold for bodies having rectangular form which comprises a bottom plate 1, side plates 2, provided with bottom flanges 3, to rest upon the bottom plate, and end plates 4, provided with bottom flanges 5, for engaging the bottom plate 1. Several parts of the mold are movable with respect to the bottom plate and each other, and are held in assembled relation by means of detachable clamps, one form of clamp for this purpose being indicated at 6, although any desired means for holding the bottom, side, and end walls of the mold in assembled relation may be employed, and I prefer to miter the ends of the side and end walls so that a close fit is obtained at the corners. In these figures, which represent the preferred form of my invention, I provide the bottom of the mold with a bottom pan 7, having upturned flanges 8—8, as shown in detail in Fig. 3, which is placed on the bottom of the mold, and the side and end plates are recessed, as indicated in Fig. 2, to receive the flanges 8, so that the inner faces of the flanges 8 are flush with the inner faces of the side and end walls. In these figures I have shown means for facing the opposite ends of the cementitious body and to this end I have provided at each end of the mold a partition member 9, one of which is shown in detail in Fig. 4. This partition consists preferably of a vertically disposed thin metal plate having its edges provided with outwardly extending spacing flanges 10 to engage the end walls of the mold and space the partition member therefrom, and the partition member is also preferably provided with inwardly extending flanges 11, as shown in Figs. 1 and 4, to retain the facing mixture or material, which is preferably mixed in such consistency that it may be spread upon the partition member 9, between the flanges 11, and retain itself in connection therewith until the central part of the body is poured. In order to prevent the displacement of the facing material or to enable it to be applied in a thinner condition, I also contemplate the use of an auxiliary partition member 12, as indicated in Fig. 1, adapted to engage the vertical edges of the flanges 11—11, and support the layer of facing material. I may in some instances provide the partition member with spacing flanges only, as indicated in Fig. 4ª, in which the partition member 9ª is shown as provided with inturned spacing flanges 10ª, and this form of partition member can be used where only one layer of facing material is required, or in case two layers of facing material as hereinbefore described are desired, the auxiliary partition member indicated at 12ª in Fig. 4ª may be provided with spacing flanges 11ª to engage the partition member 9ª, and space the auxiliary partition member therefrom.

The side walls 2 of the mold are preferably recessed to receive the flange members of the partition members 9, as indicated in Fig. 1 (or the flange members of the main and auxiliary members, if the arrangement indicated in Fig. 4ª is employed) so that there will be no ridges formed in the completed body. In employing the mold indicated in Figs. 1 and 2, and assuming that an exterior surface of dry granular material and a facing layer of moist cementitious material is to be employed on the bottom, top, and ends of the body, the bottom pan 7 will be partially filled with a layer of the dry granular material, as indicated by the dotted line x, Fig. 2, and the pan will be filled above the same with the moist or semi-liquid facing material. The space on the outside of the partitions 9 between the partition and the end walls will be filled with the dry granular material, and the space between the flanges 11—11 (or 11ª—11ª) will be filled with the moist or semi-liquid facing material which may be retained in position by the auxiliary partition member 12 (or 12ª). The central portion of the mold is then filled to the top by pouring in the liquid cementitious material and coarse granular material, as before described, and the mass is allowed to settle to the point indicated by dotted line y in Fig. 2. The partition members are then drawn from the mold together with the auxiliary partition members 12 (or 12ª if the same are used) and the liquid portions of the central mass will permeate the facing material and dry granular material at the ends and bottom, uniting them into a unitary mass. The block is completed by pouring upon the said central portion, a layer of the facing material up to the point indicated by the dotted line z, and a further layer of the granular material up to the top of the mold before the central mass has set or hardened, so that the said portions will absorb liquid portions from the central mass and firmly unite therewith. The entire body is then permitted to set, harden, and dry, and may be removed from the mold by removing the clamping devices 6 and moving the side and end walls away from the completed block.

It is to be understood that the layers of dry granular material and facing material may be of any desired thickness. As a matter of fact, I have somewhat exaggerated the thickness of these layers in the drawing, for purposes of greater clearness, and it will also be understood that if the block is to be given a particular color, the coloring matter will be inserted in the facing material. It will also be understood that the facing material may be used without the granular material, in which case it can be placed in the compartment provided on the outside of the partition members 9 between the flanges 10 thereof.

In Fig. 5 I have illustrated a different method of supporting the partition member where a single layer of facing material is required. In this figure, which illustrates a partial plan view of the mold, the end wall is illustrated at 4ª and the side walls at 2ª, and the side walls are provided with vertically disposed grooves at equal distances from the end wall, which receive the vertically disposed partition member 9ᵇ and are supported adjacent to and parallel with the end wall 4ª.

In some instances it may be desirable to face all six sides of the body, and in Fig. 6, I have illustrated an arrangement for accomplishing this result. In this case the mold is shown partially and is constructed in the same manner as that illustrated in Fig. 1, the end portions being provided with the form of partition member 9 illustrated in detail in Fig. 4, the operation of which will be clearly understood. In order to face the lateral portions of the body, additional partition members 13—13 are indicated in Fig. 6 which are provided with spacing flanges 14—14 to engage the said walls, and with inwardly extending flanges 15 to form the space for receiving the facing material when two layers of exterior facing are employed, and an auxiliary partition member 16 engaging the flanges 15 is also shown. These partition members are also removed as soon as the liquid central portion of the body is poured, and the operation will be otherwise as heretofore described.

In Fig. 7 I have shown an arrangement for molding and finishing a body circular in cross section, such as a column or the like. In this instance 20 represents the mold, which comprises a cylindrical shell which may be made in one piece or in several segments, as preferred. 21 represents a cylindrical partition member provided exteriorly with vertically disposed spacing flanges 22 to engage the mold and space the partition member therefrom, and the partition member may also be provided on its interior with vertically disposed flanges 23 for retaining the facing material when the same is used in plastic condition, and if desired, another auxiliary partition member, cylindrical in form, may be employed within the flanges 23, as indicated at 24, in case the facing material is used in a liquid or semi-liquid condition. If the two layers of facing material are employed, the dry granular material is placed in the exterior space between the partition member 21 and the mold 20, and the facing material is placed on the inner side of the partition member, and after pouring the central portion of the body in liquid or semi-liquid form, the partition member 21 and the auxiliary partition member 24, if the same is used, is withdrawn for the purposes heretofore described. Obviously the partition members 21 and 24 may be made in one piece or in several segmental pieces, as desired.

In Figs. 8 and 9 I have shown the application of my invention to a multiple mold, such, for example, as is used for the production of cementitious bricks or blocks. In these figures, 30 represents the bottom of the mold which is of a size sufficient to support a plurality of the molded blocks, and is provided with side walls 31 and end walls 32, only one of which is shown in the drawing. The side walls 31 are grooved vertically to receive detachable mold walls 33 which separate the individual blocks or bricks. I have shown such a mold provided with a plurality of the bottom pans, indicated at 7ª, having flanges 8ª of the kind illustrated in Fig. 3, and also having at each end of each mold compartment a partition member 9° of the kind illustrated in Fig. 4, provided with the spacing flanges 10° and inwardly extending flanges 11°, the end and side walls of the mold and the removable mold walls 33 being provided with recessed portions to accommodate the flanges 8ª of the bottom pans, and the flanges 10° and 11° of the partition members, as clearly shown in the drawing, so that there will be no ridges on the finished blocks or bricks. The movable partition members 9° are preferably provided at their upper ends with hook-shaped or loop portions 17, and these may conveniently serve as a hand engaging part to remove the partition members when used singly. When the partition members are used in the multiple mold, I prefer to provide a lifting rod, indicated at 40 in Fig. 9, which is connected to all of the partition members along one wall of the mold, for example, by passing a rod through the looped or tubular portions 17 so that all of these partition members may be simultaneously removed from the compartments of the mold, by raising the lifting rod 40.

What I claim and desire to secure by Letters Patent is:—

1. The combination with a mold for cementitious bodies, of a vertically disposed removable partition member, and means for holding said partition parallel to and at a predetermined distance from a vertical wall of the mold, for temporarily retaining in position a thin layer of material to form an outer surface of said molded body, said partition member being provided with means extending on the side thereof toward the center of the mold for supporting an intermediate layer of material adapted to unite with the central portion and outer surface material when said partition member is withdrawn.

2. The combination with a mold for cementitious bodies, of a vertically disposed removable partition member, provided with vertically disposed spacing flanges projecting on the exterior side thereof to engage a vertical wall of the mold and hold said member at a predetermined distance from said wall, and provide a pocket to retain a thin layer of material forming the outer surface of the molded body, said partition member being provided with vertically disposed flanges on the inner face to retain a thin intermediate layer of cementitious material adapted to unite with the central portion and the outer surface material when the partition member is removed.

3. The combination with a mold for cementitious bodies, of a vertically disposed removable partition member, provided with vertically disposed spacing flanges projecting on the exterior side thereof to engage a vertical wall of the mold and hold said member at a predetermined distance from said wall, and provide a pocket to retain a thin layer of material forming the outer surface of the molded body, the adjacent angularly disposed walls of the mold being provided with recesses open at their upper ends to receive said spacing flanges and permit the vertical withdrawal of the same.

4. The combination with a mold for cementitious bodies, of a vertically disposed removable partition member, provided with vertically disposed spacing flanges projecting on the exterior side thereof to engage a vertical wall of the mold and hold said member at a predetermined distance from said wall, and provide a pocket to retain a thin layer of material forming the outer surface of the molded body, and a bottom pan fitting the bottom of the mold and having upturned flanges at its edges, the side walls of the mold being provided with horizontal recesses to receive the said flanges of the bottom pan, and the side walls, disposed adjacent to and angularly to said partition member being provided with vertical recesses to receive the said flanges of the partitions.

5. The herein described process of molding and facing a cementitious body which consists in supporting a thin vertical layer of dry granular material, and a thin intermediate layer of semi-plastic cementitious material adjacent to and parallel to a face of the mold, pouring the central portion of the body in substantially liquid form and permitting it to unite with the intermediate layer and with the layer of granular material before setting.

6. The herein described process of molding and facing a cementitious body which consists in supporting a thin vertical layer of dry granular material, and a thin intermediate layer of semi-plastic cementitious material adjacent to and parallel to a face of the mold, pouring the central portion of the body in substantially liquid form and permitting it to unite with the intermediate layer and with the layer of granular material before setting, permitting the body portion to settle and partially set, and applying a thin layer of the surfacing material to the top of the body while in the mold, to enable it to unite therewith before the body sets.

7. The herein described process of molding and facing cementitious bodies which consists in providing a thin layer of dry granular surfacing material upon the bottom of the mold supporting a thin layer of dry granular surfacing material adjacent to a vertical wall or walls of the mold, pouring a cementitious composition in liquid form into said mold to form the central portion of the body, then bringing said liquid central portion into contact with the vertical layer of dry granular material, after the central portion is poured, to unite the particles of the dry granular material together and to the central portion, and then filling the top portion of the mold, after the liquid body portion has settled and before it has set, with a top layer of dry granular facing material to enable it to unite with the central portion and lateral facing portions before setting.

In testimony whereof I affix my signature, in the presence of two witnesses.

DAVID METRUSTRY.

Witnesses:
GRAHAM WITSCHIEF,
ELIZABETH A. FLYNN.